US008121238B2

(12) United States Patent
Raman et al.

(10) Patent No.: US 8,121,238 B2
(45) Date of Patent: Feb. 21, 2012

(54) SYSTEM AND METHOD FOR SYNCHRONIZING DIGITAL BITS IN A DATA STREAM

(75) Inventors: Sundar Raman, Fremont, CA (US); James M. Brown, Laguna Beach, CA (US)

(73) Assignee: CSR Technology Inc., San Jose, CA (US)

( * ) Notice: Subject to any disclaimer, the term of this patent is extended or adjusted under 35 U.S.C. 154(b) by 1174 days.

(21) Appl. No.: 11/553,983

(22) Filed: Oct. 27, 2006

(65) Prior Publication Data
US 2008/0002797 A1 Jan. 3, 2008

Related U.S. Application Data

(60) Provisional application No. 60/818,371, filed on Jun. 30, 2006.

(51) Int. Cl.
*H04L 7/00* (2006.01)
(52) U.S. Cl. .................................................. 375/355
(58) Field of Classification Search .................. 375/130, 375/140, 142, 145, 147, 149, 150, 316, 340, 375/343, 322–326, 354, 359, 360, 362, 365, 375/367; 370/498, 503; 713/400, 401, 500; 708/1, 3, 5, 100, 200, 207, 422, 800, 801, 708/813; 704/200, 201, 211, 216, 218, 231, 704/326, 237, 258, 263
See application file for complete search history.

(56) References Cited

U.S. PATENT DOCUMENTS

| 5,179,573 A | * | 1/1993 | Paradise .................... 375/150 |
| 5,663,734 A | | 9/1997 | Krasner |
| 5,663,735 A | | 9/1997 | Eshenbach |

(Continued)

FOREIGN PATENT DOCUMENTS
WO  WO00/065751   11/2000

OTHER PUBLICATIONS

Marketing Material: Global Locate—Hammerhead II™, Single Chip AGPS Solution (2 pages), 2007.

(Continued)

*Primary Examiner* — David C. Payne
*Assistant Examiner* — Vineeta Panwalkar
(74) *Attorney, Agent, or Firm* — RatnerPrestia

(57) ABSTRACT

A system and method for synchronizing a receiver of a bit stream to the bit stream include a correlator to remove the PN code modulation and to generate a stream of time sequence values (samples) from the received bits. A plurality of accumulators are included, each accumulator corresponding to an offset in a series of time intervals starting with a first time period. The accumulators add a number of values equal to a number of samples in a bit period. The values added by each accumulator is a set of values starting with the value at the offset corresponding to the accumulator. A plurality of magnitude calculators receives a sum from the corresponding accumulator and calculates a magnitude. A plurality of non-coherent summers are then used to add the magnitudes for each offset in each bit period for all of the received bits. The total sum in each non-coherent summer is then analyzed to find the highest value, such that the offset corresponding to the non-coherent summer with the highest value represents the location of the bit transition in the bit period.

28 Claims, 13 Drawing Sheets

U.S. PATENT DOCUMENTS

| | | |
|---|---|---|
| 5,781,156 A | 7/1998 | Krasner |
| 5,812,087 A | 9/1998 | Krasner |
| 5,825,327 A | 10/1998 | Krasner |
| 5,831,574 A | 11/1998 | Krasner |
| 5,841,396 A | 11/1998 | Krasner |
| 5,874,914 A | 2/1999 | Krasner |
| 5,884,214 A | 3/1999 | Krasner |
| 5,945,944 A | 8/1999 | Krasner |
| 5,999,124 A | 12/1999 | Sheynblat |
| 6,002,363 A | 12/1999 | Krasner |
| 6,016,119 A | 1/2000 | Krasner |
| 6,052,081 A | 4/2000 | Krasner |
| 6,061,018 A | 5/2000 | Sheynblat |
| 6,064,336 A | 5/2000 | Krasner |
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |
| 6,131,067 A | 10/2000 | Girerd |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |
| 6,185,427 B1 | 2/2001 | Krasner |
| 6,208,290 B1 | 3/2001 | Krasner |
| 6,208,291 B1 | 3/2001 | Krasner |
| 6,215,441 B1 | 4/2001 | Moeglein |
| 6,215,442 B1 | 4/2001 | Sheynblat |
| 6,236,354 B1 | 5/2001 | Krasner |
| 6,239,742 B1 | 5/2001 | Krasner |
| 6,249,542 B1 * | 6/2001 | Kohli et al. .................. 375/150 |
| 6,259,399 B1 | 7/2001 | Krasner |
| 6,272,430 B1 | 8/2001 | Krasner |
| 6,289,041 B1 | 9/2001 | Krasner |
| 6,307,504 B1 | 10/2001 | Sheynblat |
| 6,313,786 B1 | 11/2001 | Sheynblat |
| 6,314,308 B1 | 11/2001 | Sheynblat |
| 6,377,209 B1 | 4/2002 | Krasner |
| 6,408,196 B2 | 6/2002 | Sheynblat |
| 6,411,254 B1 | 6/2002 | Moeglein |
| 6,411,892 B1 | 6/2002 | Van Diggelen |
| 6,417,801 B1 | 7/2002 | Van Diggelen |
| 6,421,002 B2 | 7/2002 | Krasner |
| 6,429,814 B1 | 8/2002 | Van Diggelen et al. |
| 6,433,731 B1 | 8/2002 | Sheynblat |
| 6,453,237 B1 | 9/2002 | Fuchs et al. |
| 6,484,097 B2 | 11/2002 | Fuchs et al. |
| 6,487,499 B1 | 11/2002 | Fuchs et al. |
| 6,510,387 B2 | 1/2003 | Fuchs et al. |
| 6,542,821 B2 | 4/2003 | Krasner |
| 6,583,757 B2 | 6/2003 | Krasner |
| 6,597,311 B2 | 7/2003 | Sheynblat |
| 6,934,322 B2 | 8/2005 | King |
| 2004/0264554 A1 | 12/2004 | Harms et al. |
| 2006/0222058 A1 | 10/2006 | Simic et al. |
| 2006/0222129 A1 * | 10/2006 | Hadzic et al. .................. 375/355 |

OTHER PUBLICATIONS

Marketing Material/White Paper: SnapTrack: A Qualcomm Company—SnapTrack's Wireless Assisted GPS™(A-GPS) Solution Provides The Industry's Best location System—Location Technologies for GSM, GPRS and WCDMA Networks (Qualcomm CDMA Technologies: Enabling the Future of Communications ) (4 pages), 2003.

Marketing Material: Qualcomm CDMA Technologies—Integrated Solutions—MGP6200™Multimode GPS Processor (8 pages), Feb. 2003.

Marketing Material: uNav Microelectronics—uN9x18 Low Power, High Performance GPS Receiver Chipset/uN9x18 GPS Receiver Solution (9 pages).

Marketing Material: uNav Microelectronics, uN9x18 Low Power, High Performance GPS Receiver Chipset (2 pages).

Marketing Material: Global Locate—Hammerhead II™, Single Chip AGPS Solution (2 pages), 2007.

Marketing Material/Press Release: Broadcom Introduces Advanced Single-Chip GPS Solution for Mobile Applications (3 pages).

Marketing Material/White Paper: SnapTrack: A Qualcomm Company—SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages), 2003.

* cited by examiner

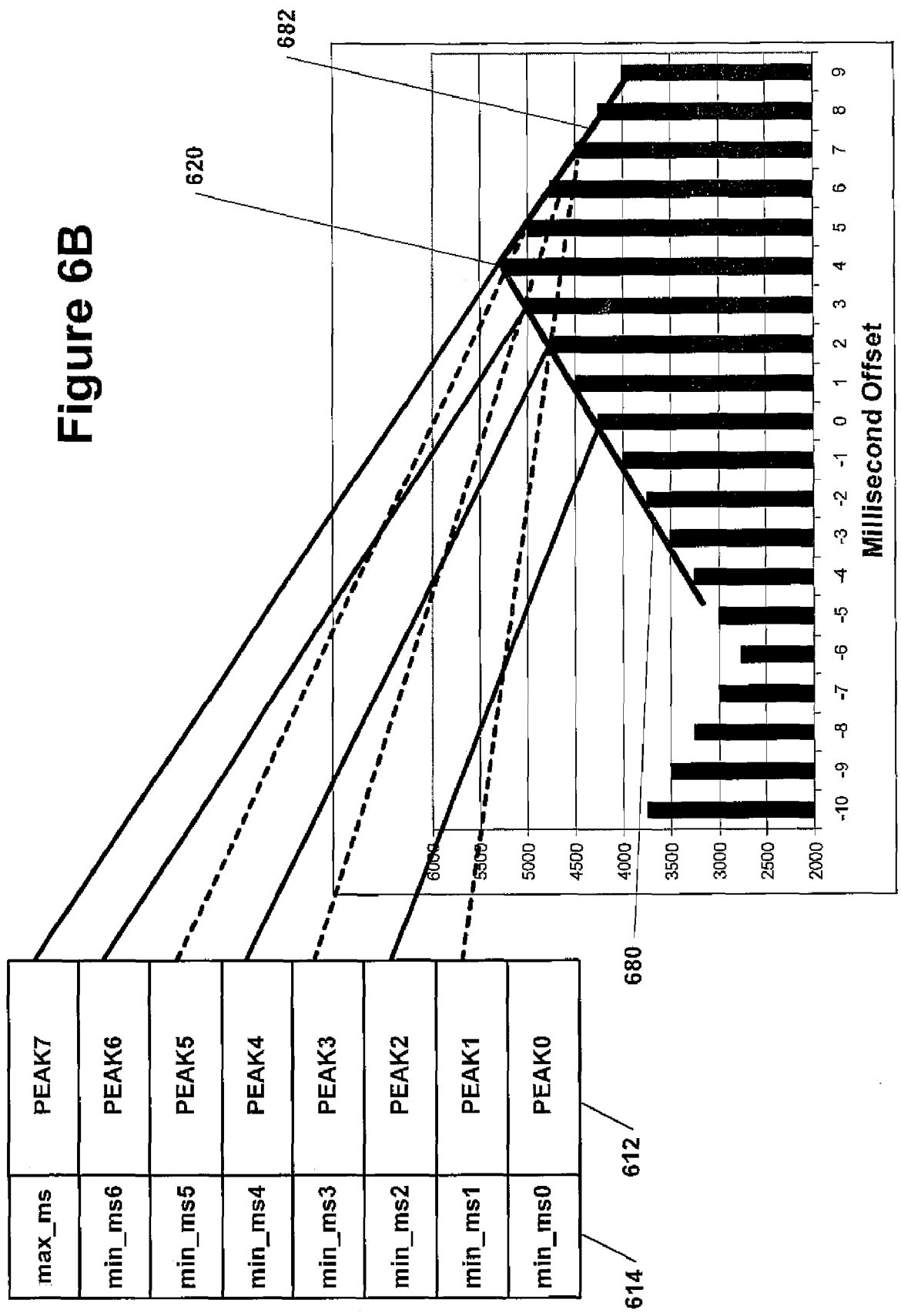

Define: max_ms = msec offset of maximum peak
peak_right_1 = interpolated peak at max_ms +1
peak_right_2 = interpolated peak at max_ms +2
peak_right_3 = interpolated peak at max_ms +3
peak_left_1 = interpolated peak at max_ms -1
peak_left_2 = interpolated peak at max_ms -2
peak_left_3 = interpolated peak at max_ms -3
Slope_left = slope of best fit line through peaks at max_ms -1, -2, -3
Slope_right = negative of the slope of best fit line through peaks at max_ms +1, +2, +3
Intercept_left = predicted peak at max_ms using left data
Intercept_right = predicted peak at max_ms using right data
Intersection_ms = intersection of right and left best fit lines
P_trans = probability of bit transition in received data ← 850

Six Point Analysis:

Slope_left = (peak_left_1 – peak_left_3)/2
Slope_right = (peak_right_1 – peak_right_3)/2  ← 854

P_trans = 5* (Slope_left + Slope_right)/PEAK7  ← 856

IF(P_trans < 12%) BREAK

Intercept_left = (4*peak_left_1 + peak_left_2 – 2*peak_left_3)/3
Intercept_right = (4*peak_right_1 + peak_right_2 – 2*peak_right_3)/3  ← 858

Intersection_ms = (Intercept_right – Intercept_left)/(Slope_left + Slope_right)  ← 860

If(ABS(Intersection_ms) >=0.5, Then BREAK  ← 862

Figure 7C

SYSTEM AND METHOD FOR SYNCHRONIZING DIGITAL BITS IN A DATA STREAM

CROSS-REFERENCE TO RELATED APPLICATIONS

The application claims priority to U.S. Provisional Patent Application Ser. No. 60/818,371, titled "System and Method For Synchronizing Digital Bits in a Data Stream," by Raman et al and filed on Jun. 30, 2006, which is herein incorporated by reference in its entirety.

BACKGROUND OF THE INVENTION

1. Field of the Invention

This invention relates to communications systems, and more particularly to systems and methods for synchronizing digital bits in a data stream.

2. Description of Related Art

Typical digital communication systems involve using a transmitter to send a bit stream to a receiver. The bit stream contains digital information that the receiver decodes and makes use of. In some communications systems, the digital information is extracted by first converting the analog representation of the bit stream to digital samples. Each sample represents the amplitude of the signal at the time of sampling. The digital samples may be analyzed for location of the bit transitions by detecting where the amplitude levels change.

Because of noise and other effects, the transitions may not be cleanly represented as digital samples. This is especially true in wireless communications systems having an air interface. Global Navigation Satellite Systems (GNSS) are especially sensitive because the GNSS signals are communicated between satellites above the earth's atmosphere and receivers on the earth's surface. In addition, the signal transmitted to the receiver is generated by the transmitter and therefore synchronized to the time base in the transmitter. Thus, the signal is not synchronized to the receiver's time base such that the location of the bit transitions in the receiver's time base cannot be assumed.

Several methods have been developed for detecting bit transitions in a stream of digital samples. Examples of such methods (from the realm of GNSS receivers) include:

1. "Histogram Method"—This method is based on 1 msec samples. In this method, the samples are analyzed for transitions in level between successive samples. The method incorporates heuristics based on counting transitions used to identify data bit edges. The problem with this method is that it fails below about 30 dB-Hz.
2. "Viterbi" method—This method is loosely based on an algorithm published by Andrew Viterbi. In this method, a trellis is used to track bit transition decision and a maximum likelihood method is used to determine data bid edges. The performance of this method is good. But, at low levels of carrier to noise spectral density ratio $C/N_o$, the method yield unacceptable levels of "False Positive" indications—i.e., it falsely claims to have identified a data bit edge.

Because the levels of $C/N_0$ can vary and may reach very low levels, neither of the above methods is as reliable as desired. There is a need for methods and systems for obtaining improved bit transition detection.

SUMMARY

In view of the above, examples of systems and methods for synchronizing a receiver of a bit stream to the bit stream include a correlator to remove the PN code modulation and to generate a stream of time sequence values (samples) from the received bits. A plurality of accumulators are included, each accumulator corresponding to all offset in a series of time intervals starting with a first time period. The accumulators add a number of values equal to a number of samples in a bit period. The values added by each accumulator is a set of values starting with the value at the offset corresponding to the accumulator. A plurality of magnitude calculators receives a sum from the corresponding accumulator and calculates a magnitude. A plurality of non-coherent summers are then used to add the magnitudes for each offset in each bit period for all of the received bits. The total sum in each non-coherent summer is then analyzed to find the highest value, such that the offset corresponding to the non-coherent summer with the highest value represents the location of the bit transition in the bit period.

Various advantages, aspects and novel features of the present invention, as well as details of an illustrated embodiment thereof, will be more fully understood from the following description and drawings.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 6B is a schematic diagram illustrating an example of a layout of valid peaks on a bit sync magnitude diagram.

FIG. 7C is pseudo-code illustrating operation of an example of a six point method for detecting and analyzing a bit synchronization consistent with the present invention.

DETAILED DESCRIPTION

In the following description of preferred embodiments, reference is made to the accompanying drawings that form a part hereof and which show, by way of illustration, specific embodiments in which the invention may be practiced. Other embodiments may be utilized and structural changes may be made without departing from the scope of the present invention.

Figure 1:
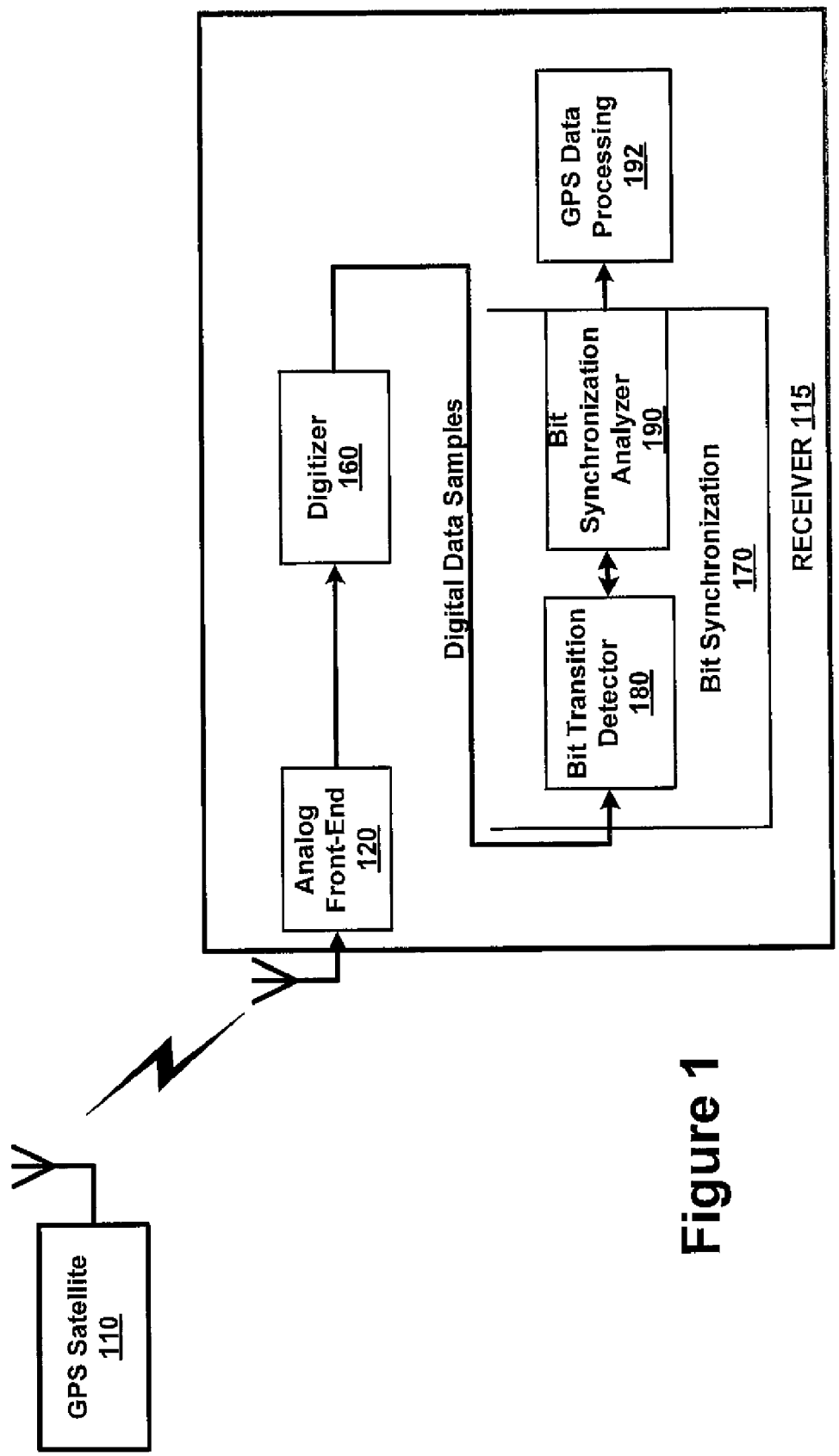
FIG. 1 is a block diagram of an example of a GNSS system of the type that can male advantageous use of examples of the present invention.

FIG. 1 is a block diagram of an example of a GNSS system of the type that can make advantageous use of examples of the present invention. FIG. 1 shows a GNSS satellite 110 communicating signals to a GNSS receiver 115. Actually, more than one GNSS satellite 110 may communicate with any given GNSS receiver 115. For purposes of illustration, the description that follows focuses on communication by a single satellite. The GNSS receiver 115 includes an analog front-end 120, a digitizer 160, a bit synchronization process 170 and a GNSS data processing system 192. The signals sent by the GNSS satellite 110 includes orbit data relating to the GNSS satellite 110 containing, for example, the satellite's orbit, time information, and delay time. The GNSS receiver 115 uses the orbit data and range measurements from the satellites to calculate its own position.

Typical GNSS receivers 115 are designed to receive a spread-spectrum radio signal encoded with a code called L1 band C/A (Coarse/Acquisition) transmitted by the GNSS satellites 110. The C/A code is a code of a PN (pseudorandom) noise sequence having a transmission signal rate (or chip rate) of 1.023 MHz and a code length of 1023 (i.e., 1 period=1 millisecond). The data bits are 20 milliseconds long and are synchronized to the code. One of the 1 ms periods in each 20 ms period is selected by the satellite as the beginning of the data period. The data bits and the PN code are summed, modulo 2, then modulated onto a carrier using Binary Phase Shift Keying (BPSK). The nominal carrier frequency is 1575.42 MHz.

The GNSS receiver initially assumes that its local bit rate clock, which is running at a 20 ms rate, is aligned with the received data bits. Using examples of embodiments consistent with the present invention, this assumption may be tested, any nonalignment may be determined and corrected, and the correction may be tested to ensure an accurate correction.

The analog front-end 120 receives the radio signal and demodulates the signal to yield an IF analog signal. The digitizer 160 converts the analog signal to a stream of digital samples representing the amplitude of the signal at each sample time. Each bit of the satellite signal has a 20 ms period. This results in a data transmission rate of 50 bps. The receiver 115 operates with a system of clocks that provide a time base that is not in synchronization with that of the received signal. Therefore, the bit edges cannot be assumed to be aligned exactly with the beginning of the 20 ms. periods. The bit synchronization processor 170 analyzes the digital samples against the 20 ms. clock cycles to locate the precise location of the start of each bit, or the bit transition. Once the bit transitions are located, the bit stream is analyzed for the desired information in the GNSS data processing system 192.

It should be understood that the process of bit synchronization may be performed either during, or after, the process of signal acquisition.

In a GNSS receiver, signal acquisition involves the search for signal energy over a multitude of PN code offsets, and a multitude of frequency offsets. This is typically visualized as a 2 dimensional search, with one dimension being frequency offset and the other dimension being code offset.

'Frequency offset' refers to the frequency difference between the received signal and a locally generated reference signal. Its magnitude is implementation dependent, but may be on the order of several KHz. The frequency dimension is commonly broken into discrete 'bins', using a digital Fourier transform technique.

'Code offset' refers to the degree of time synchronization between the received code and a locally generated code. The code dimension is also broken into discrete segments known as 'taps'. The maximum length of the code dimension is 1 millisecond. Typical implementations may divide the code dimension into as many as 2046 taps.

If the bit synchronization process is to be performed during the signal acquisition process, then a third dimension is added to the two previously described. Each of the frequency bin/ code tap combinations must be examined at each of (up to) 20 time offsets, each time offset corresponding to 1 millisecond, i.e., one complete cycle of the code. Resulting measures of signal strength (peaks) may be tagged with the frequency bin, code tap and millisecond offset to allow for further analysis.

If the bit synchronization process is performed after the signal acquisition is complete, then the number of frequency bins and code taps may be reduced dramatically, possibly as low as 1 bin and 1 tap. In addition, the sizes of the bins/taps may be reduced for enhanced performance. In this case also, the signal may be actively tracked by other receiver processes while the synchronization process is active.

The bit synchronization processor 170 in FIG. 1 includes a bit transition detector 180 and a bit synchronization analyzer 190. The bit transition detector 180 detects the starting point of each bit in each 20 ms. period. The bit synchronization analyzer 190 analyzes the results to confirm whether the actual bit transition was located with sufficient accuracy.

In general, bit synchronization methods are dependent on the presence of bit transitions. The systems and methods described herein use that fact explicitly. For example, systems and methods consistent with the present invention include steps and functions that estimate the probability of bit transition. Accordingly, systems and methods consistent with the present invention advantageously require less time to achieve similar success (which may be measured by a probability of false alarm) at bit synchronization for a given signal strength as compared to other existing methods.

1. Bit Transition Detection

Figure 2:
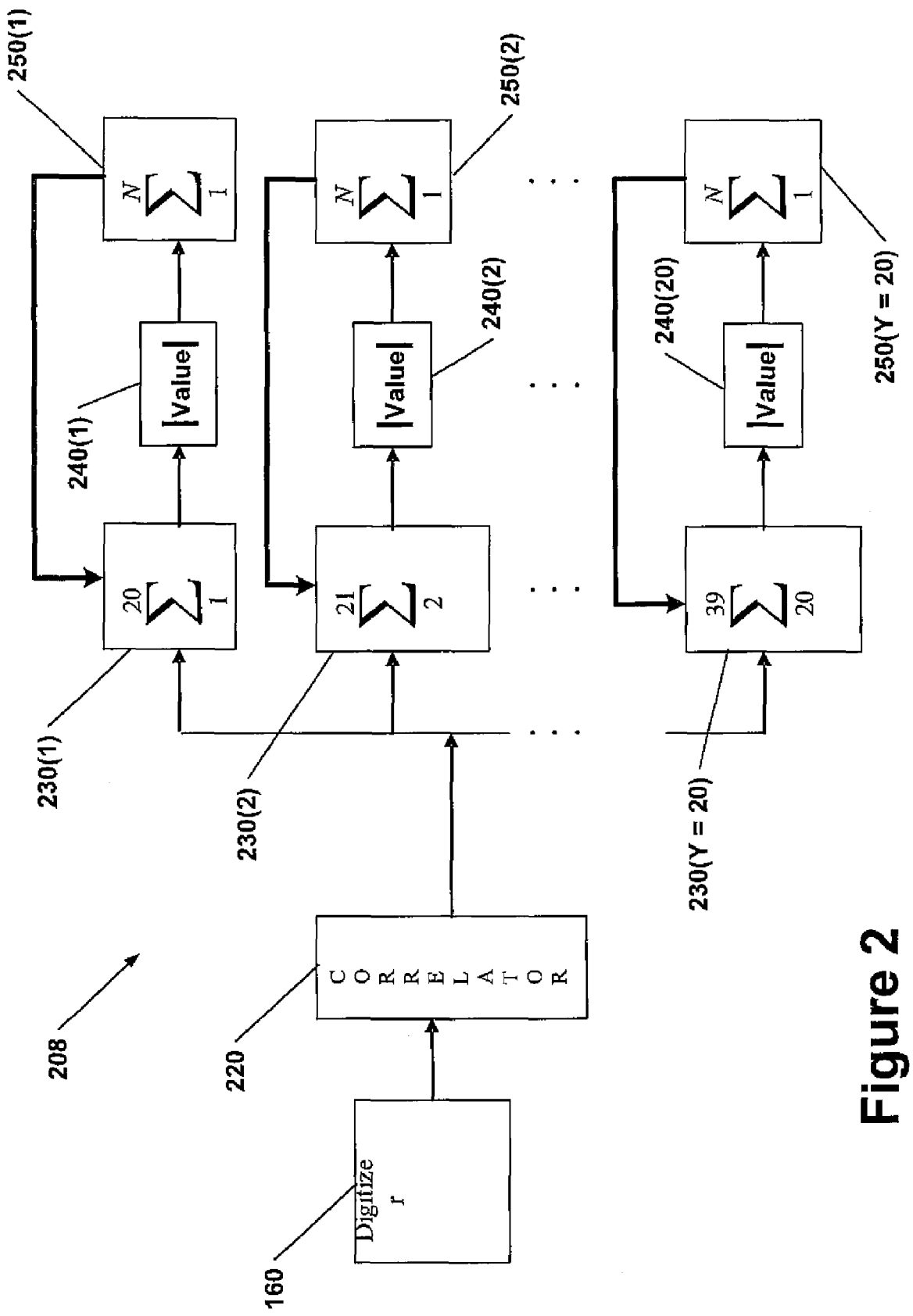
FIG. 2 is a block diagram of an example of a bit transition detecting system and method consistent with the present invention.

FIG. 2 is a block diagram of an example of a bit transition detector 208 consistent with the present invention. For clarity, a single bin/tap combination are shown. The bit transition detector 208 in FIG. 2 includes a correlator 220, 20 offset accumulators 230(1)-230(20), 20 magnitude calculators 240 (1)-240(20), and 20 non-coherent summers 250(1)-250(20). FIG. 2 also shows a digitizer 160, which converts the analog IF signal to digital samples. One of ordinary skill in the art will appreciate that each of the correlators, accumulators, magnitude calculators and non-coherent summers may be implemented in hardware, software or combination of hardware and software. Actual implementations depend on specific needs, budgets, and other design constraints and/or issues. One of ordinary skill in the art will appreciate that, although a quantity or a 'plurality' of components may be described, there may not be more than one component used. For example, components (such as, for example, the accumulators, calculators, or summers) may be multiplexed to simulate the use of a plurality of actual devices.

The bit transition detector 208 in FIG. 2 operates in a GNSS receiver. Those of ordinary skill in the art will appreciate that this process is performed in a GNSS receiver along three dimensions: the frequency domain dimension, a first time domain (0-20 ms) dimension, and a second time domain (0-1 ms) dimension (code taps). The bit transition detector 208 in FIG. 2 is described below as operating in a GNSS receiver to detect bit transitions in the time domain from 0-20 ms. In a GNSS receiver, bit synchronization is also performed in the frequency domain (FFT bins) and the time domain (0-1 ms. taps). Therefore, the bit transition detector 208 in FIG. 2 represents bit detection along the 0-20 ms time domain dimension for one bin in the frequency domain and one tap in the 0-1 ms time domain. The output non-coherent summers 250 form an array within a multi-dimensional array containing the results of bit synchronization in all three dimensions.

The bit transition detector 208 analyzes the bit stream using a finite sample of received bits. In one example embodiment, the finite sample size, may range from 50 to 200 bits. The sample size may vary. The actual size may depend on the number of bit transitions and/or signal strength. The correlator 220 receives the digital samples and correlates the samples in the time domain by removing the PN code. The correlator 220 outputs a time sequence of 1 ms. samples of complex data. Because the samples are in complex form, the data is generated in a stream of pairs of digital samples, I and Q values. A first millisecond period is defined as the location on the 20 ms bit period of each bit transition. However, because the received signal is not synchronized to the receiver's time base, the actual bit transition is likely not at the first millisecond period. The bit transition detector 208 determines which millisecond offset ("ms offset") following the first millisecond period is the location of the actual bit transition.

One of ordinary skill in the art will appreciate that the example of FIG. 2 depicts operation of an example of an embodiment consistent with the present invention in which the bit period T is 20 ms. and the sample period S=1 ms. The number of accumulators may be generalized to be a number Y<=T/S.

The I and Q values are summed in the 20 offset accumulators 230(1)-230(20), each offset accumulator 230 starting the summation at a different one of the millisecond offsets in a 20 ms. period, which is the bit period. The first offset accumulator 230(1) begins the summation at the first millisecond period (ms offset=0) and sums the samples at each of the following millisecond periods. The second offset accumulator 230(2) begins the summation at the next millisecond period after the first millisecond period (ms offset=1). The third offset accumulator 230(3) starts at a ms offset=2. The fourth offset accumulators 230(4) starts summing at a ms offset=3. Each of the following offset accumulators 230(5)-(20) start summing at each successive ms. offset. As stated above, the bit period, T, is 20 ms. and the bits are sampled at a sample time of S=1 ms. Therefore, one of the offset accumulators 230 will have summed up all the values in one exact bit period.

In each offset accumulator 230, a counter counts up to 20 as the samples are summed in the accumulators 230. After the $20^{th}$ sample is added in the accumulator 230, the contents of the accumulators 230 are input to corresponding magnitude calculators 240. The magnitude calculators 240 calculate the magnitude of the sums in the accumulators 230 using the formula:

$$V = \sqrt{I^2 + Q^2}$$

One of ordinary skill in the art will appreciate that, since I and Q represent the signal amplitude, V is the magnitude of the voltage of the signal at that 20 ms. sample. In alternative embodiments, the power of the signal at each 20 ms. sample may be used instead. Differences in embodiments of systems and methods for detecting bit transition that uses power signals instead of voltage are described below with reference to FIG. 5.

The magnitude calculators 240(1)-(20) output the magnitudes of the samples to a corresponding non-coherent summer 250(1)-(20), which performs an integration of the magnitudes over the finite sample of received bits at each ms offset in the 20 ms period. The non-coherent summer 250 containing the highest value, or the peak value, corresponds with the ms offset in the 20 ms period that is the location of the bit transition. However, if the $C/N_0$ level is low, the detection of the bit transition may be in error. At the conclusion of the integration, the non-coherent summers 250(1)-(20) are analyzed by selecting a set of the highest values out of the 20 non-coherent summers and applying them to the bit synchronization analyzer 190. The bit synchronization analyzer 190 is described below in more detail with reference to FIGS. 5-7.

Figure 3:
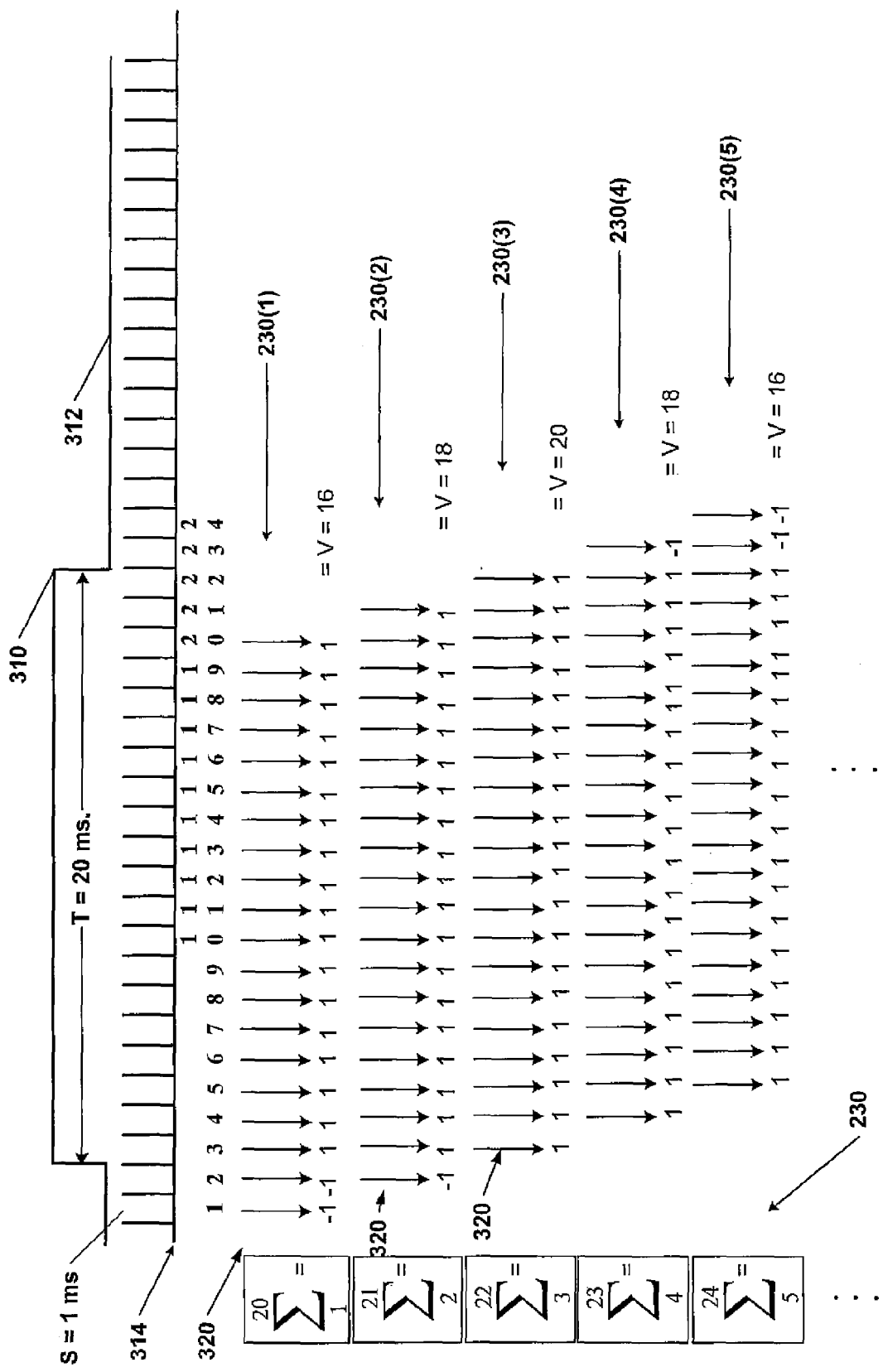
FIG. 3 is a schematic diagram illustrating operation of a first part of the bit transition detecting system shown in FIG. 2.

FIG. 3 is a schematic diagram illustrating operation of a first part of the bit transition detecting system shown in FIG. 2. Two bits 310, 312 with T=20 ms periods are depicted graphically at the top of FIG. 3 over a timeline 314. The amplitude of the bits 310, 312 are normalized for purposes of illustration to a level of 1 for a logic 1, and a level of −1 for a logic 0. The timeline 314 is divided into S=1 ms. intervals. Each 1 ms interval is numbered, with the ms interval number 3 representing the first millisecond period in the first bit 310. The accumulators 230 are shown on the right side of FIG. 3. A set of arrows 320 drop from each time interval to indicate the level at each interval that is to be added in each accumulator 230. The level to be added at each interval is indicated by the bit level at that given ms interval.

As shown in FIG. 3, the first offset accumulator 230(1) starts summing at the first millisecond period. For the first two millisecond periods, the level is −1 and the accumulator 230(1) is decremented twice at the first two millisecond periods. At the third millisecond interval, the bit transition occurs and the level changes to 1. The bit level remains 1 for the next 20 ms intervals, but the first accumulator 230(1) stops summing at the $20^{th}$ interval while the level remains at level 1. The total sum in the first accumulator is V=16. The second offset accumulator 230(2) starts summing at the second millisecond interval, which has a bit level of −1. The bit transitions to level 1 in the next interval and the accumulator 230(2) ends up with a sum of V=18. The process continues with the third accumulator 230(3) starting at the next ms interval, the fourth accumulator 230(4) starting with the next ins interval after that, until all twenty accumulators 230(1)-(20) have performed their summation of the levels. The example in FIG. 3 uses a normalized bit level. The process actually operates on I and Q values separately.

As illustrated in FIG. 3, the third accumulator 230(3) sums the levels within one entire bit. The other accumulators 230 summed levels that cross into the second bit 312, and eventually, if all 20 accumulators were shown, levels from the bit following the second bit 312 are summed as well. Because the third accumulator 230(3) summed levels within one bit, it will contain the highest number as the final sum. This is because there are bit transitions on either side of the first bit 310 and the accumulators containing sums of levels that are in both the first bit 310 and the second bit 312, or the first bit 310 and the preceding bit are reduced by the negative numbers of the levels in the bits that are not the first bit 310. It should be noted that once the levels are summed, it is the magnitude that is analyzed. Thus, if the bit transition being detected was for a transition to a logic 0, e.g. the level of the second bit 312, the magnitude of the accumulator that sums all of the levels in the bit will still be the largest number. If there are no transitions across several bits, the accumulators will end up with the same or similar magnitudes. However, the process continues with the remaining bits in the sample size with the assumption that there are transitions between later bits.

Figure 4:
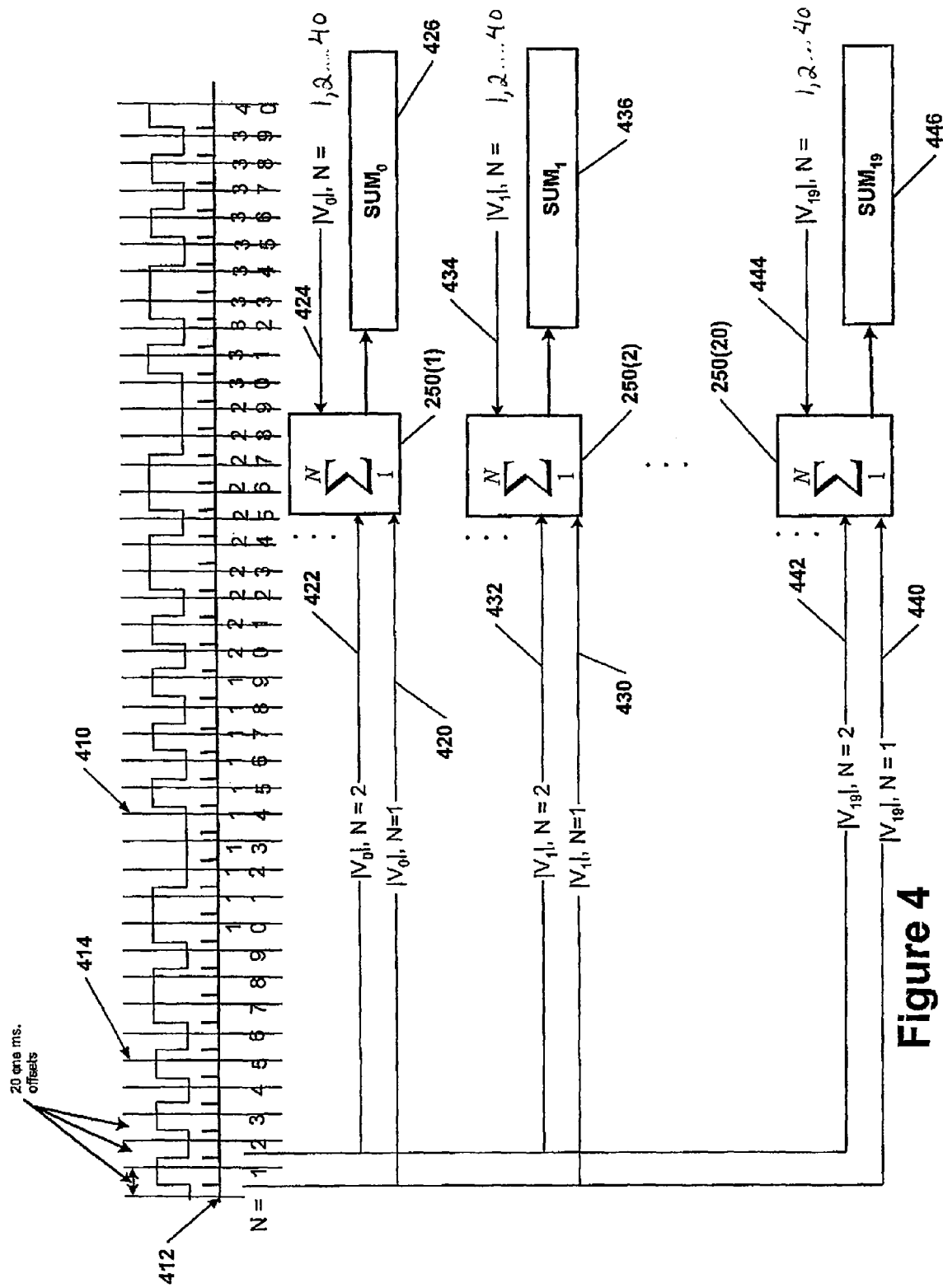
FIG. 4 is another schematic diagram illustrating operation of second part of the bit transition detecting system shown in FIG. 2.

FIG. 4 is another schematic diagram illustrating operation of second part of the bit transition detecting system shown in FIG. 2. Once the accumulators 230(1)-(20) have completed a sum, the magnitude of the values is calculated and the magnitude for the ms offset represented by the accumulators is added to a running sum in the non-coherent summers 250. FIG. 4 shows a bit stream 410 of 40 bits representing an example of a finite sample of received bits. The bit stream 410 is shown on a timeline 412. The timeline 412 has first millisecond period markers 414 to indicate the first millisecond period representing the 0 ins offset period that starts each 20 ms bit period. Between the markers 414 are 20 one ms periods, which the accumulators 230(1)-(20) use as the offsets to begin summation of the values.

In each bit period, the magnitude for each ms offset is calculated and added to the non-coherent summer 250 corresponding to that ms offset. For example, FIG. 4 shows a magnitude $|V_0|$ for the bit period N=1 being added to the first (0 ms offset) non-coherent summer 250(1) at arrow 420. A second magnitude $|V_0|$ calculated for the bit period N=2 at the 0 ms offset is being added to the first non-coherent summer 250(1) at arrow 422. The process continues for all of the bit periods in the sample; that is, until N=40 in the example shown by arrow 424 in FIG. 4. The result of the integration is represented by a value $SUM_0$ 426.

Similarly, a magnitude $|V_1|$ for the bit period N=1 is added to the second (1 ms offset) non-coherent summer 250(2) at arrow 430. A second magnitude $|V_1|$ calculated for the bit period N=2 at the 1 ms offset is being added to the second non-coherent summer 250(2) at arrow 432. The process continues for all of the bit periods in the sample (until N=40) as shown by arrow 434 in FIG. 4. The result of the integration is represented by a value $SUM_1$ 436.

The non-coherent summers 250(3)-(20) perform a similar process for the 3-20 ms offsets. The twentieth non-coherent summer 250(20) is shown in FIG. 4 receiving a magnitude $|V_{19}|$ for the bit period N=1 being added to the twentieth (20 ms offset) non-coherent summer 250(20) at arrow 440. A second magnitude $|V_{19}|$ calculated for the bit period N=2 at the 20 ms offset is being added to the twentieth non-coherent summer 250(20) at arrow 442. The process continues for all of the bit periods in the sample until N=40 as shown by arrow 444 in FIG. 4. The result of the integration is represented by a value $SUM_{19}$ 446.

Figure 5A:
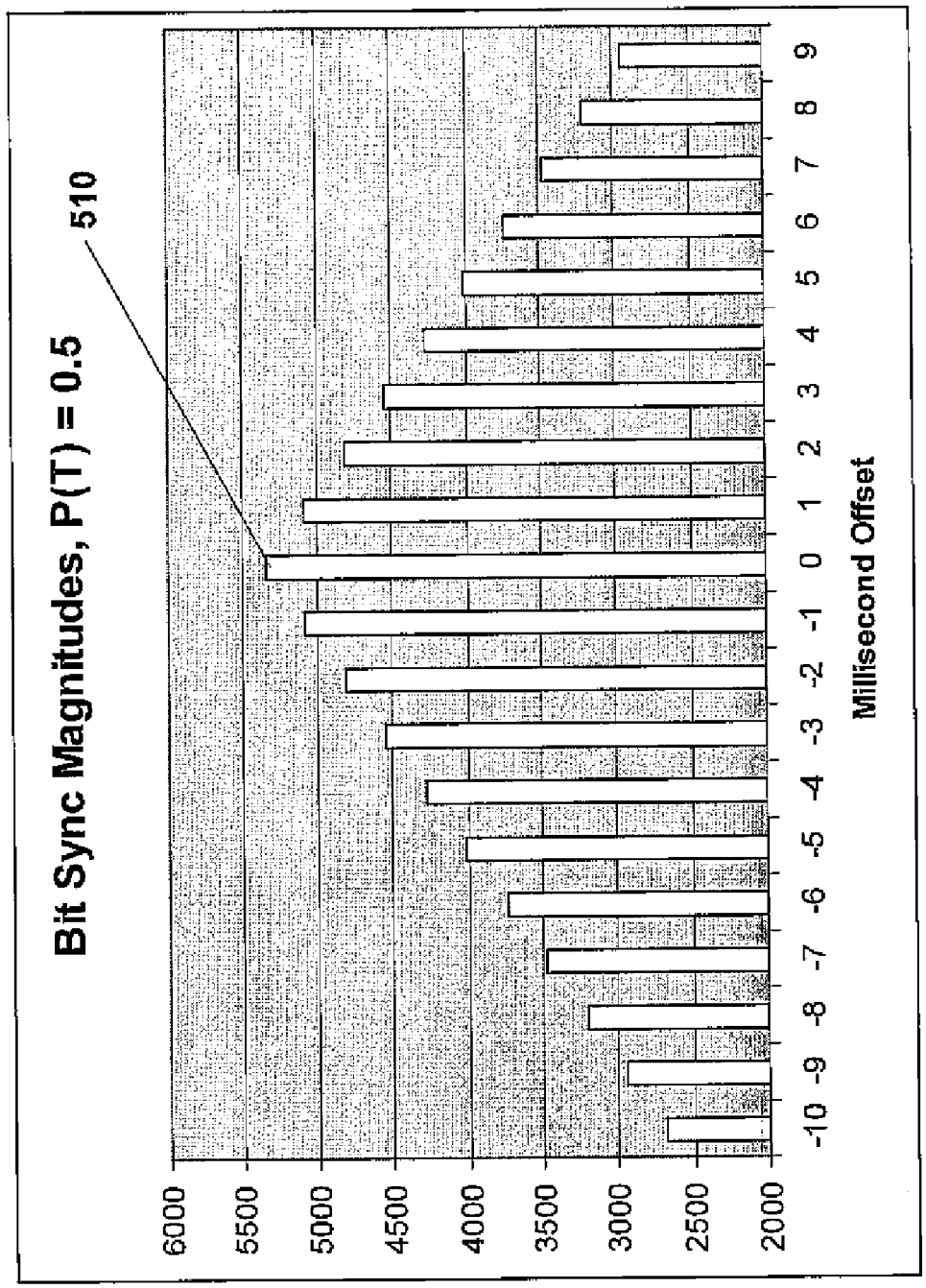
FIGS. 5A-5C are examples of bit synchronization magnitude diagrams.
Figure 5B:
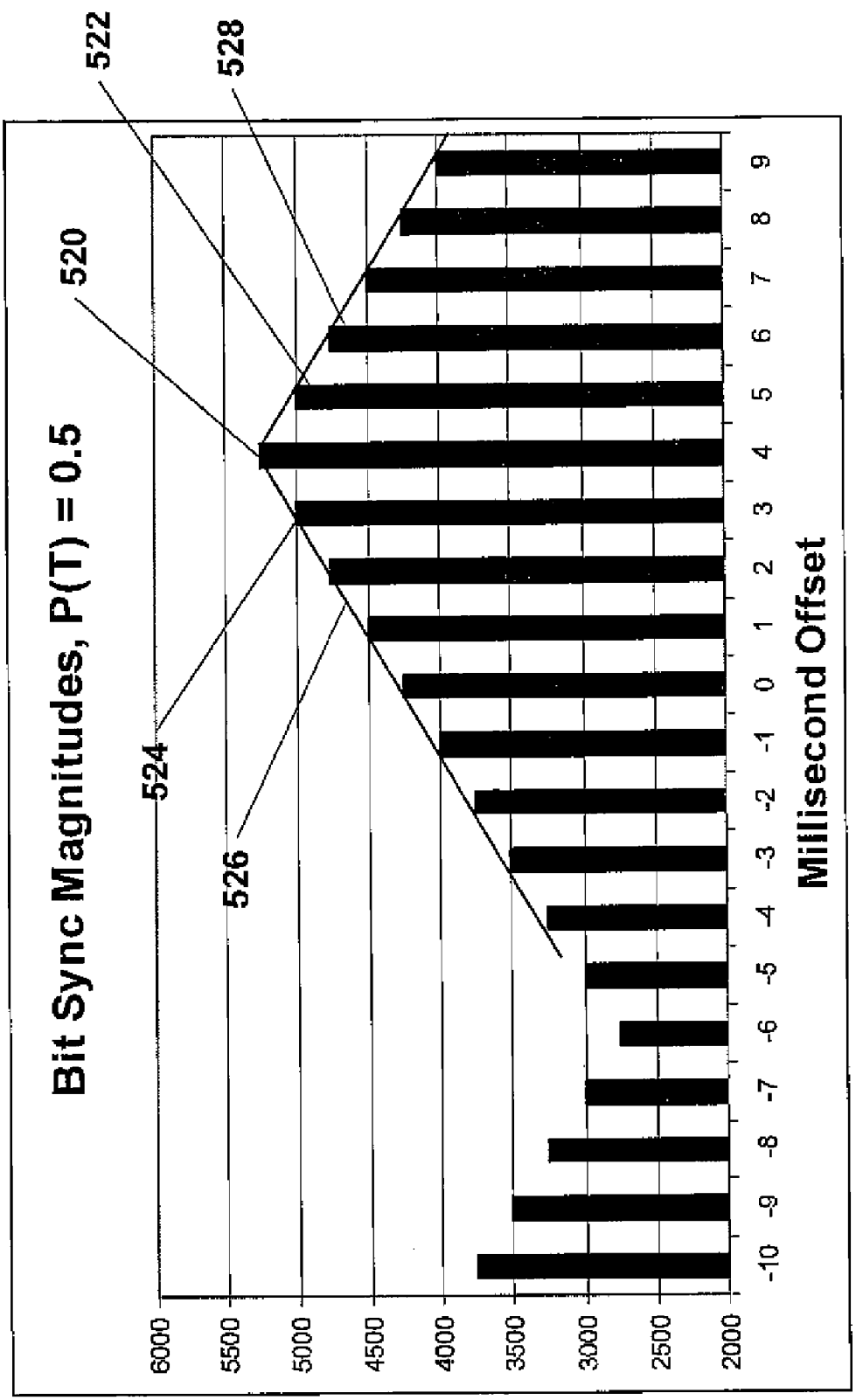

The result of the integration by non-coherent summers 250(1)-(20) is the set of sums of magnitudes ($SUM_0$-$SUM_{19}$) 426, 436, 446. These sums of magnitudes may be plotted against their corresponding ms offsets. FIGS. 5A and 5B are examples of bit sync magnitude plots that may be generated by the bit detection process described above. The diagram in FIG. 5A represents a bit transition detection in a noise-less environment where the received signal is synchronized with the receiver's time base. The bit sync magnitude diagram in FIG. 5A is a triangular shaped plot having a peak value 510 at the 0 ms offset. Because the receiver's time base may not be synchronized with the time base of the satellite that generated the bit stream, the peak value 510 may actually be located at a different ms offset.

FIG. 5B shows a bit sync magnitude diagram also generated in a noiseless environment but, reflecting receipt of a signal that is not synchronized with the receiver time base. The bit sync magnitude diagram in FIG. 5B is also substantially triangular and has a set of peaks 520, 522, 524 identified. The peak at 520 represents the main peak in the diagram. The peaks at 522 and 524 (and possibly other lesser peaks) are minor peaks as discussed below. FIG. 5B also shows a line 526 indicating a slope that is referred to as 'SLOPE_LEFT' in the description of a bit transition analysis process below. A line 528 may be drawn to the right of the main peak 520 indicating a slope referred to as 'SLOPE_RIGHT.' Note that in a noiseless case, the triangle is symmetrical about the main peak, i.e. the right and left slopes equidistant from the center will be equal in magnitudes and the slopes will intersect at the main peak.

Figure 5C:
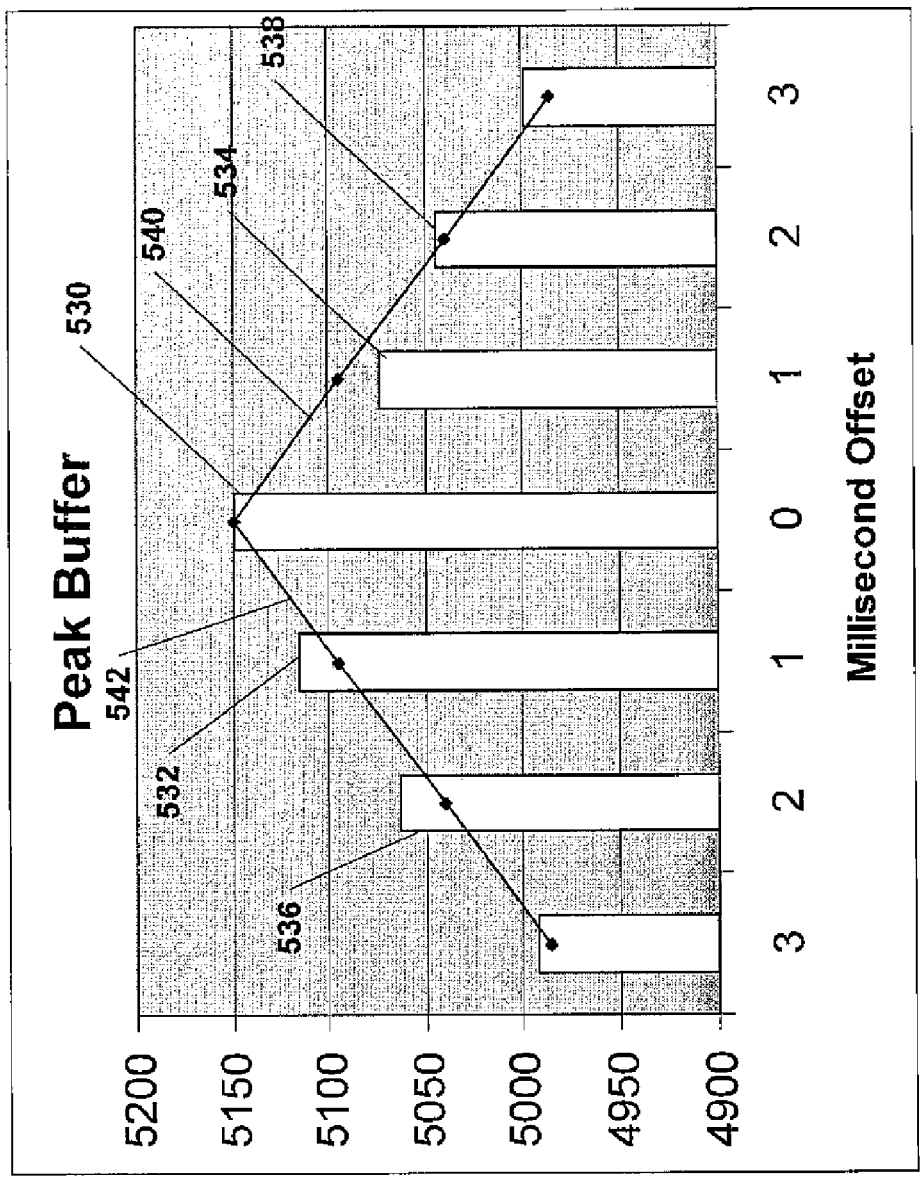

FIG. 5C shows a bit sync magnitude diagram generated in a more noisy environment reflecting receipt of a signal that is synchronized with the receiver time base. The bit sync magnitude diagram in FIG. 5C includes a main peak 530 and a set of minor peaks 532, 534, 536, et seq. The effect of the noise on the analysis is reflected in the different magnitudes of the minor peaks at equidistant offsets relative to the main peak 530. For example, the minor peak 532 at 1 ms offset to the left of the main peak 530 has a greater magnitude than the minor peak 534 at 1 ms offset to the right of the main peak 530. Similarly, the minor peak 536 at 2 ms offsets to the left of the main peak 530 has a greater magnitude than the minor peak 538 at 2 ms offset to the right of the main peak 530. An ideal right line 540 to the right of the main peak 530 contains points illustrating the levels of the minor peaks at the relevant offsets for the same signal received in a noiseless environment. An ideal left line 542 to the left of the main peak 530 contains points illustrating the levels of the minor peaks at the relevant offsets for the same signal received in a noiseless environment.

FIG. 5C illustrates how noise may affect the signal and hamper the bit synchronization process. In examples of methods of validating bit synchronization consistent with the present invention, linear/curve fitting techniques may be implemented to generate lines through the minor peaks and the main peak to estimate where the main peak should be given the samples used in the bit transition detection process. The difference between the location of the main peak and where the main peak should have been may be used to determine the extent to which the bit transition detection process was successful in finding the correct location.

The diagram in FIG. 5B indicates that the main peak 520 is at offset 4, which indicates that the bit transition detector 180 described above determined that the location of the bit transition is at an offset of 4 ms from the predicted time point. The level of noise may affect the ability to correctly detect the bit transition location. In examples of the present invention, a bit synchronization analyzer 190 (in FIG. 1) is used to determine whether the bit transition location was found.

The bit sync magnitude diagrams described above with reference to FIGS. 5A and 5B are triangular shaped and analyzed below as such. The triangular shape results from performing the bit transition detector process by analyzing the amplitude, or voltage level, of the bit signal. As stated above, the detector may also analyze power levels. If power levels are analyzed, the bit sync magnitude diagrams are not triangular. Instead, the diagram would have a peak, but the slope from the peak towards either side of the peak would be curved instead of linear. This means that a bit synchronization analyzer 190 that analyzes a bit sync power magnitude diagram would use second order curve fits instead of slopes in the analysis.

2. Bit Synchronization Analysis

In one example of a bit synchronization analysis method consistent with the present invention, a set of the sums of magnitudes are analyzed as peak values at their corresponding offsets. As shown by the bit sync magnitude diagrams in FIGS. 5A and 5B, one sum of magnitudes may be a highest peak, and therefore designated as a main peak for purposes of analysis. The remaining peak values may form a first substantially linear pattern descending from the right of the main peak and a second substantially linear pattern descending from the left of the main peak. In a noiseless environment, the substantially linear patterns to the right and left of the main peak intersect at the main peak.

a. Peak Buffer

Figure 6A:
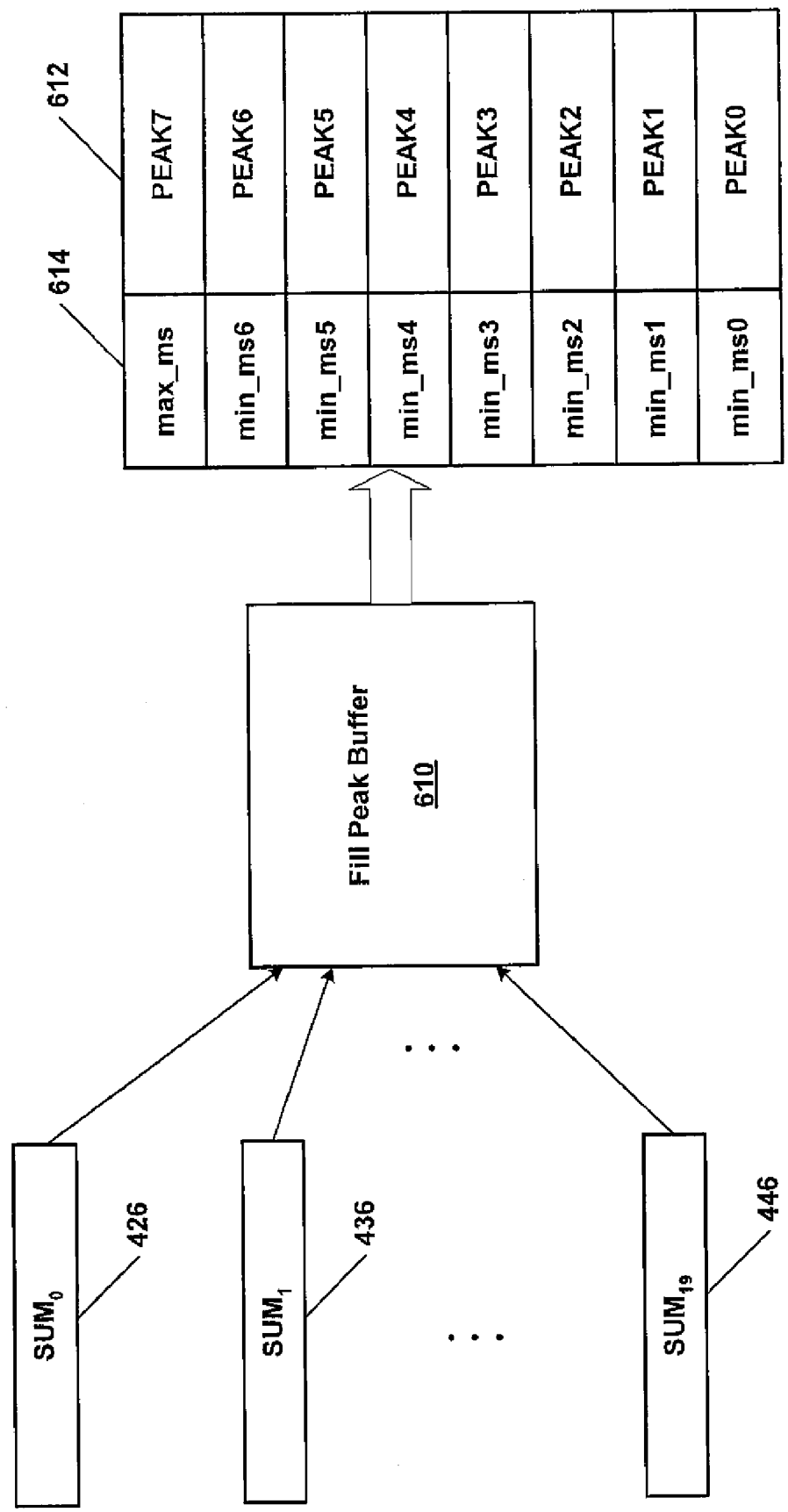
FIG. 6A is a flowchart illustrating operation of a first part of a bit synchronization analyzer.

FIG. 6A is a flowchart illustrating operation of a first part of an example of an embodiment of a bit synchronization analyzer 190. The bit synchronization analyzer 190 includes a process for identifying a peak value set and storing the peak value set in a peak buffer, or array. As shown in FIG. 6A, the 20 sums of magnitudes 426, 436, 446 are input into a process 610 in which a peak buffer 612 is filled with the peak values. In one example of the invention, the peak buffer 612 contains the 8 highest sums of magnitudes. The largest peak value is stored in a register PEAK7. The next highest peak value is stored in a register PEAK6. The next highest peak values are stored in the remaining buffers PEAK5-PEAK0 in descending order. The peak buffer 612 may be associated with an offset array 614 aligned with the peak buffer 612 to indicate the ms offset corresponding to the non-coherent summer containing the sum of magnitudes identified as a peak at that ms offset. PEAK7 is the highest sum of magnitudes is associated with a first array location containing its offset, which is identified in FIG. 6A as max_ms. The remaining offsets are identified as min_ms6, min_ms5, min_ms4, etc. to reflect the minor peak with which it is associated. The offset array 614 may be viewed as a tag for the peak values in the peak buffer 612. In one example, the offset array 614 and the peak buffer 612 may be implemented as one 2-dimensional array.

Given the peak buffer contents, a process may be used to determine if the smaller peaks correspond to the same FFT bin and code tap as the largest peak, before proceeding with bit sync determination. Peaks that do not correspond with the frequency bin and code tap of the main peak are discarded. The remaining peaks may be re-ordered and used in a bit synchronization analysis process.

Next, the remaining peaks in the peak buffer are checked to ensure that the size of the peak is inversely proportional to the "distance" from the main peak, measured by the difference in millisecond offset from the main peak, modulo 20. For example, the distance between PEAK7 and PEAK6 (or PEAK5), if they exist, should be either 1 millisecond or −1 millisecond. Similarly the distance between PEAK7 and PEAK4 (or PEAK3), if they exist, should be either 2 milliseconds or −2 milliseconds. Finally, the distance between PEAK7 and PEAK2 (or PEAK1), if they exist, should be either 3 milliseconds or −3 milliseconds. Any peaks which fail this test are marked as invalid.

b. Bit Synchronization Analysis Method Selection

In an example of embodiments consistent with the present invention, one or more of several bit synchronization analysis methods may be selected depending on the values in the peak buffer array. The peak buffer array may be analyzed to determine if the peak values stored in the array are valid peaks. The appropriate bit synchronization analysis method is then selected based on the number of valid peak values.

If the peak buffer contains at least 6 valid peaks in addition to the main peak, then the 6-point method is chosen. If the peak buffer contains fewer than 6, but at least 4, valid peaks in addition to the main peak, then the 4-point method is chosen. If the peak buffer contains fewer than 4, but at least 2 valid peaks in addition to the main peak, then the 2-point method is chosen. If the peak buffer contains fewer than 2 valid peaks in addition to the main peal, the process waits for more data.

If either the 4-point method or the 6-point method was chosen, but the C/No is less than 30 dB-Hz, then the 2-point method is chosen instead.

FIG. 6B illustrates one method of validating the peak values in the peak buffer array 612. The peak buffer array 612 is ordered such that the highest peak is first and each lower peak (i.e. minor peak) follows in order from largest to smallest. An example of a method for validating the peaks includes comparing the minor peaks to the values of the sums of magnitudes in the offsets relative to the offset of the main peak 620. The second and third highest peaks 622, 624 are valid if they are in the next two buffer array slots (PEAK5 and PEAK6). The second and third highest peaks 622, 624 may be in either of the next two buffer array slots. It does not matter which one they are in. The second and third highest peaks 622, 624 may or may not have lie same value. The fourth and fifth highest peaks 626, 628 are valid if they are in the next two buffer array slots (PEAK3 and PEAK4). The sixth and seventh peaks 630, 632 are valid if they are in the next two buffer array slots (PEAK1 and PEA12).

The analysis methods described below may include a check of the probability of bit transition to ensure that it is at least a certain level. The probability of bit transition is directly proportional to the slope of the sides of the triangles formed by the data values (see FIGS. 5A, 5B). In the absence of bit transitions and no noise, the slope will be zero with all bins at the same level. This check is used for two reasons. First, because it is possible for the data bits to generate a side frequency having significant amplitude. Such a signal is known as a 'data side lobe' and when processed with examples of methods and systems consistent with the present invention, the triangle formed may be due to a set of samples from this side lobe. If so, the bit synchronization methods described herein will fail. The slope (and so the apparent probability of transition) of the sides of such a triangle tends to be small. Second, because the data set used must have a minimum number of bit transitions before the methods described herein are able to form an accurate estimate of their location. Through a combination of analysis and experimentation, a slope of greater than 12% has been found to be indicative of a likelihood of an accurate estimate of the bit transition location in the data received.

The analysis method may also check the number of bit transitions in the bits processed to determine if an acceptable number of bit transitions has occurred. If too few bit transitions occurred, the location of bit transition may not have been accurately determined. The number of data bit transitions may be computed by using:

$$\text{No. bit transitions} = p\_trans * T(elapsed)secs. * 50 \text{ bps}.$$

where p_trans is the probability of transition described above.

The number of bit transitions is then compared with a threshold to determine if the bit synchronization was accurately determined. The threshold depends on the $C/N_0$ level and on which method of analysis is being used. This comparison may be done using a look-up table to obtain the threshold. Table 1 below is an example of a table that may be used for threshold levels of bit transitions in a sample of bits. If the number of bit transitions is greater than the threshold number of bit transitions, then the bit transition analysis method may be performed, or deemed to be based on an acceptable set of data. In Table 1 the notation "N/A" means "Not Applicable".

TABLE 1

THRESHOLD NO. OF BIT TRANSITIONS

| C/No (dB-Hz) | 2-point | 4-point | 6-point |
| --- | --- | --- | --- |
| 35 | 10 | 6 | 5 |
| 30 | 10 | 14 | 11 |
| 27 | 13 | 23 | 20 |
| 23 | 42 | 74 | 59 |
| 20 | 50 | N/A | N/A |
| 17 | 60 | N/A | N/A |
| <17 | 75 | N/A | N/A | c. 2 Points Method

Figure 7A:
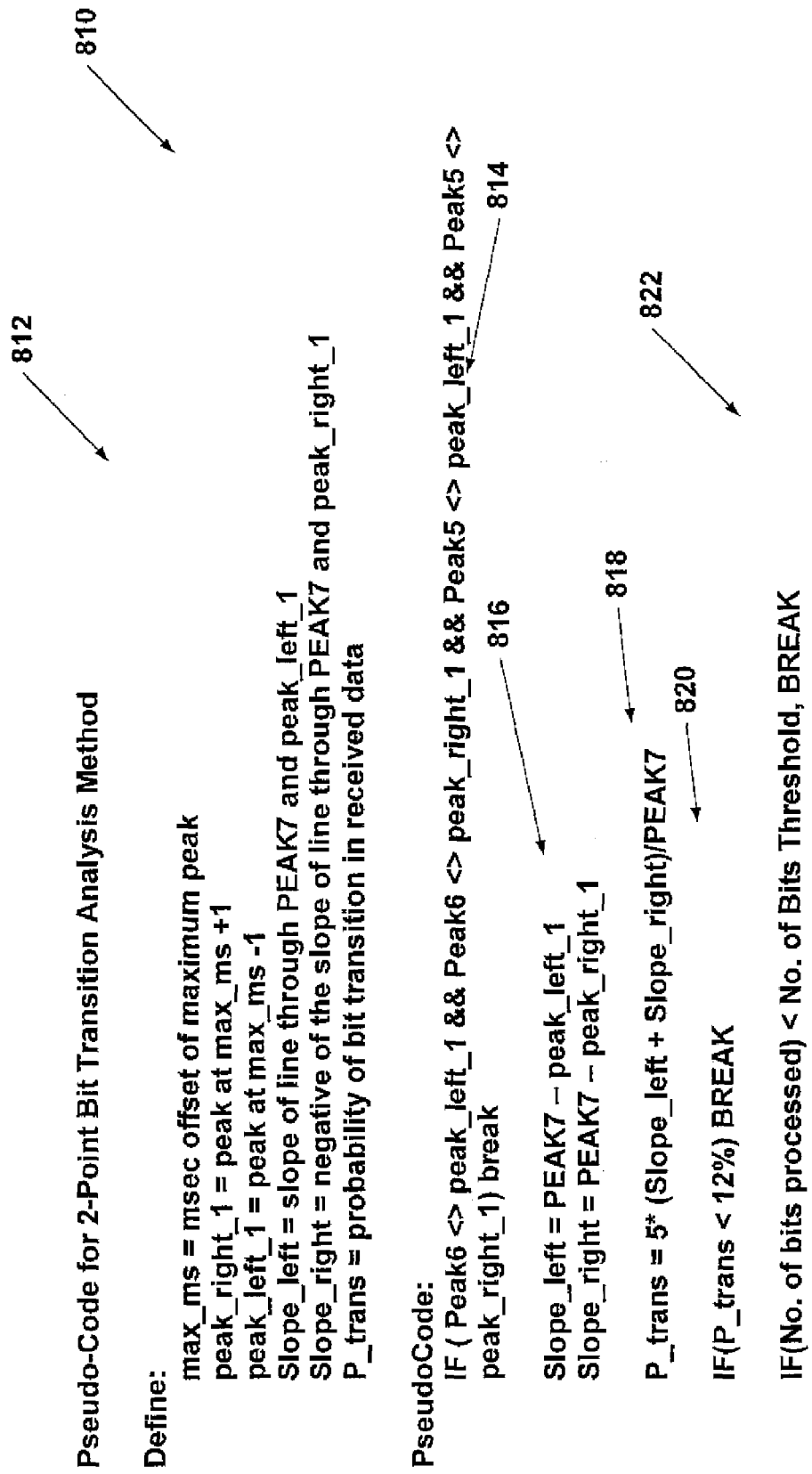
FIG. 7A is pseudo-code illustrating operation of an example of a two point method for detecting and analyzing a bit synchronization consistent with the present invention.

An example of pseudo-code that implements a two point bit synchronization analysis method 810 is shown in FIG. 7A. The two points method 810 includes statements defining variables that may be used in the method at 812. The pseudo-code of the two points method 810 in FIG. 7A also includes an example of a test for using the two points method 814, which includes testing whether the second and third highest peak values in the peak buffer array contain the peak values one offset to the right and one offset to the left of the peak value. Another test that may be included in the two points method is a statement that tests if the two largest minor peaks are not within 1 millisecond on the main peak. The two points method 810 computes both right and left slopes at 816, using the three points from the peak buffer. These three points are the main peak value and the two minor peaks. The two points method 810 then computes the probability of transition using the right and left slopes at 818 and the main peak. If the probability of transition is less than 12%, the two points method 810 halts and waits for more data. Those of ordinary skill in the art will appreciate that the 12% minimum probability is specific to the example illustrated in FIG. 7A and may be different for different implementations.

The two points method 810 then computes the number of data bit transitions that have been processed and looks up a threshold number from a look-up table as described above with reference to Table 1. If a sufficient number of bit transitions have been processed, the method declares success, otherwise it waits for more data. One of ordinary skill in the art will appreciate that the threshold need not be retrieved from a lookup table, but rather may be calculated using hardware and/or software computational devices.

d. 4 Points Method

Figure 7B:
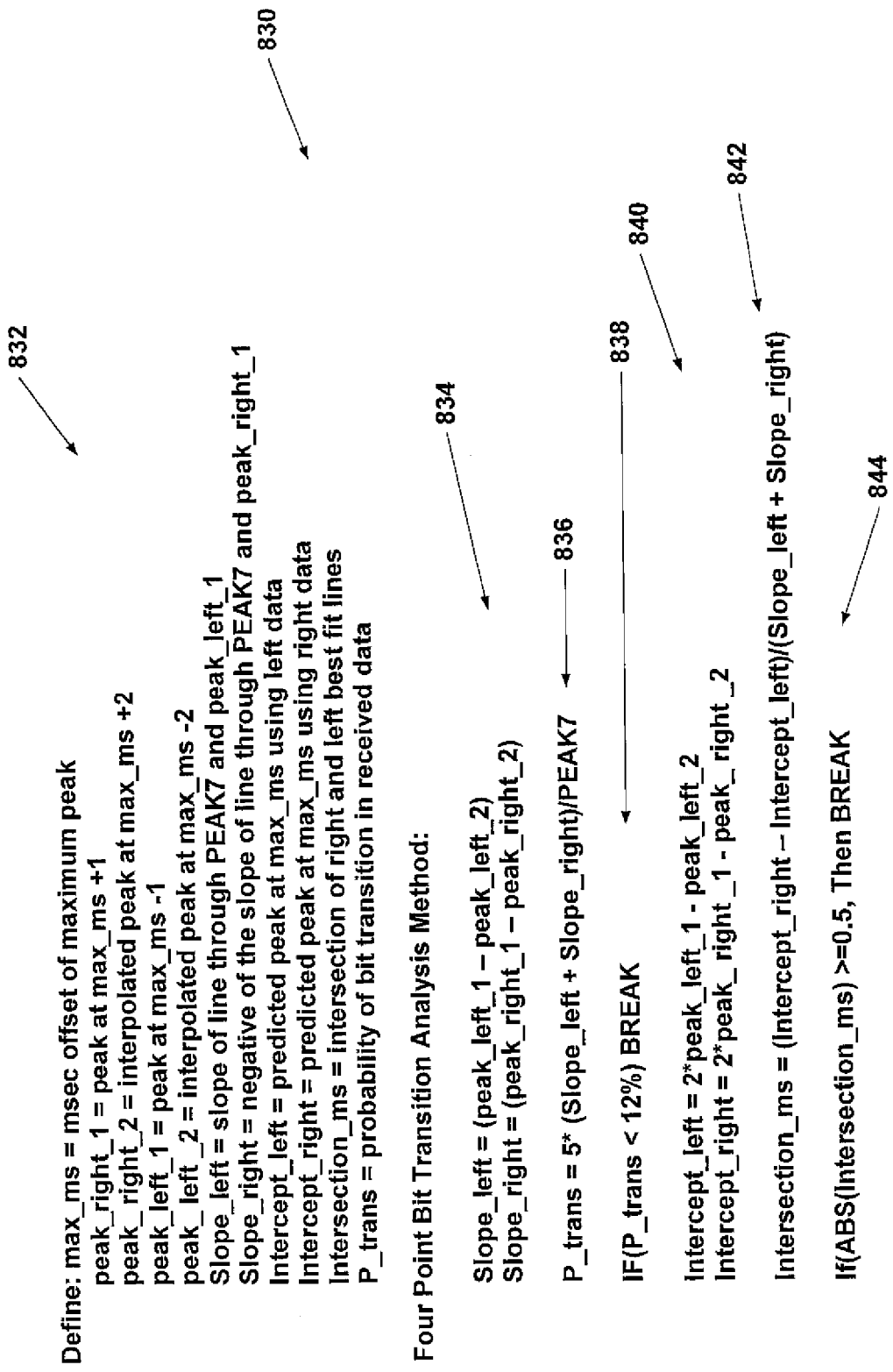
FIG. 7B is pseudo-code illustrating operation of an example of a four point method for detecting and analyzing a bit synchronization consistent with the present invention.

An example of pseudo-code that implements the four points method is shown at 830 in FIG. 7B. The four points method 830 includes statements 832 defining a set of variables that may be used in performing the four points method 830. The four points method 830 computes both right and left slopes at 834 using 4 points from the peak buffer. The four points method 830 then computes the probability of transition P_trans, at 836, and tests the probability at 838. If the probability of transition is less tan 12%, the four points method 830 may halt and wait for more data. In some examples of the four point method 830, the test for the number of bit transitions may also be performed as described above with reference to Table 1. The four points method 830 then computes right and left intercepts for each of the right and left lines as shown at 840. Using the slopes and intercepts of each of the right and left lines, the four points method 830 determines the intersection point between the two lines at 842. The intersection of the two lines yields a time value along the ms offsets and represents an offset location for a predicted peak value. At 844, the intersection, or offset location of the predicted peak value, is tested to determine if it is within 0.5 ms of the max peak. If the intersection point is within 0.5 msec of the max peak, the four points method 830 declares the bit sync successful, otherwise it may wait for more data.

e. Six Points Method

An example of pseudo-code that implements the six point method 850 is shown in FIG. 7C. The pseudo-code in FIG. 7C includes definitions of variables that may be used in the six point method 850 at 852. The six point method 850 forms a best fit straight line through the 3 points to the left of the proposed peak, the three points to the right of the peak, and then checks to see that they intersect "close enough" to the proposed peak. The slopes of both the right and left lines are calculated at 854 using the first peak to the right and left of the main peak and the third peak to the light and left of the main peak. The difference of is divided by two (the two offsets between the first and third peaks) to obtain the slopes. At 856, the slopes are used to calculate the probability of transition, which is tested in a manner similar to that described above for the two and four points methods. The six point method 850 may also perform the number of bit transition test described above with reference to Table 1.

The slopes of the right and left lines are used to determine an intercept for each of the right and left lines at 858. The intercepts and slopes are then used to calculate an intersection in a manner similar to that described above with reference to the four points method 830. The location of the intersection on the offsets time line is then compared with 0.5 to determine if it is close enough to the location of the peak value determined by the bit transition detection process.

f. Estimated Probability of False Alarms

Figure 8:
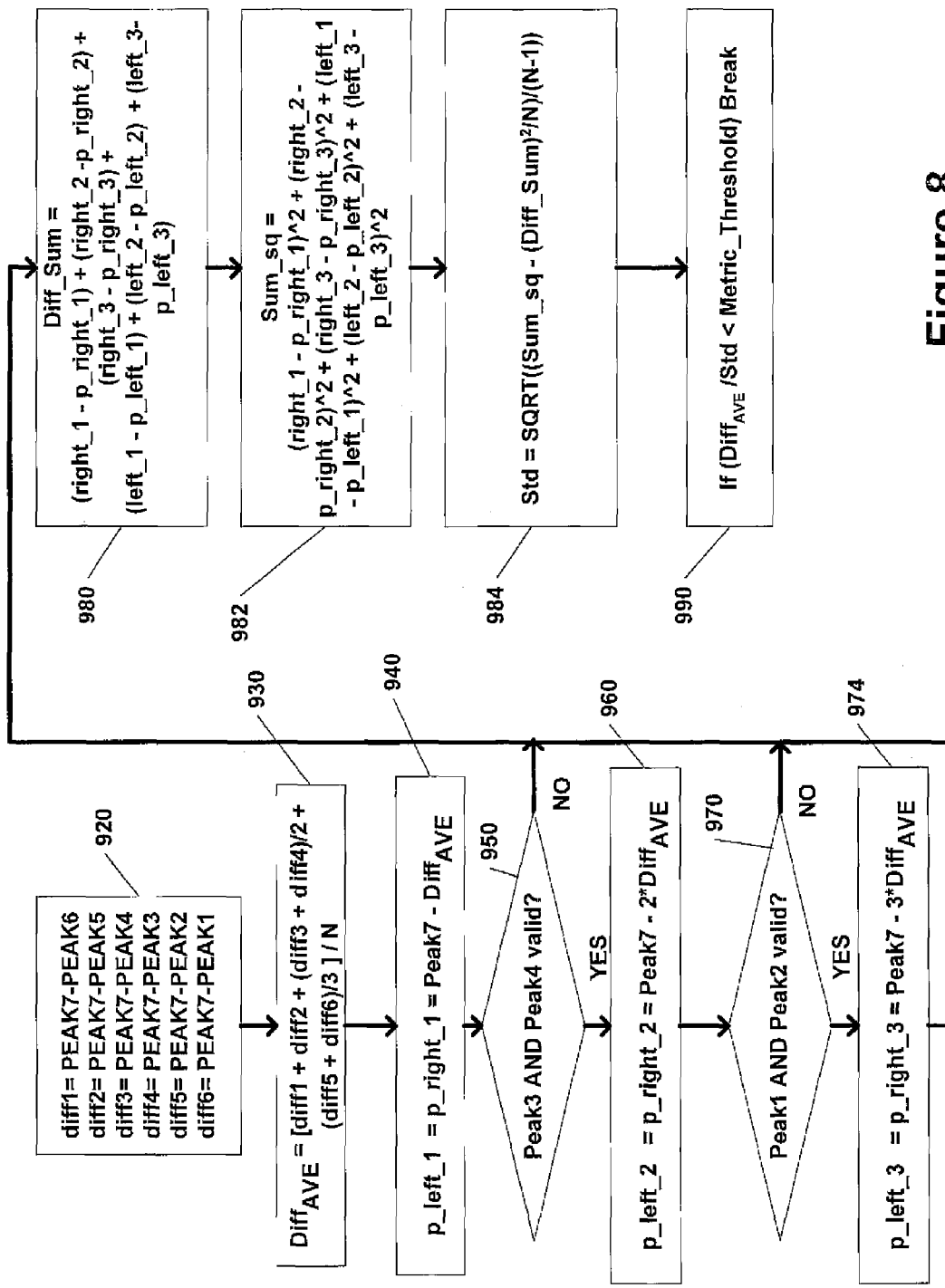
FIG. 8 is a flowchart of an example method for calculating a probability of false alarms that may be used in a bit synchronization analysis method.

FIG. 8 is a flowchart depicting operation of another method consistent with the present invention which estimates the expected false alarm rate from the contents of the peak buffer array 612 (shown in FIG. 6B). Using the peak buffer 612, the differences between the actual peaks and the peaks which would result from a "perfect" triangle may be calculated using the measured peak and the measured probability of transition. In the example shown in FIG. 8, it is assumed that as many of the valid peaks are being used as possible even if they weren't used in one of the above-described bit synchronization analysis methods.

In the flowchart in FIG. 8, a set of differences is calculated at step 920. These differences (diff1 through diff6) reflect the differences in peak values between the highest peak (Peak7) and each of the lesser peaks (Peak6 through Peak1). It may not be possible to determine a difference from Peak7 at some of the peaks if the peaks aren't valid. At step 930, the average of the differences diff1–diff6 may be calculated using:

$$\text{Diff}_{AVE}=[\text{diff1}+\text{diff2}+(\text{diff3}+\text{diff4})/2+(\text{diff5}+\text{diff6})/3]/N,$$

where N is the number of differences actually calculated. That is, N may be either 2, 4, or 6, since not all of the peaks may be valid.

Using the calculated value, $\text{Diff}_{AVE}$, new peak values are calculated at step 940 for the peak one offset to the right of PEAK7 and one offset to the left of PEAK7. These new peak values represent peak values that would form a perfect triangle on a bit sync magnitude diagram. Therefore, the peak values at offsets opposite each other relative to the offset of the main peak should be the same. This ideal value for each peak value may be calculated using the calculated $\text{Diff}_{AVE}$ for the peaks one offset from PEAK7 as follows:

$$p\_\text{left1}=p\_\text{right}\_1=\text{Peak7}-\text{Diff}_{AVE}$$

At decision block 950, the method determines if Peak3 and Peak4 are valid peaks, and if they are not, processing continues to step 980. If Peak3 and Peak4 are valid, then at step 960, new values of the peak values two offsets from PEAK7 are calculated using:

$$p\_left\_2 = p\_right\_2 = Peak7 - 2*Diff_{AVE}$$

At decision block 970, the method determines if Peak1 and Peak2 are valid peaks, and if they are not, processing continues to step 980. If Peak1 and Peak2 are valid, then at step 974, new values of the peak values 3 offsets to the right and left of the PEAK7 offsets are calculated using:

$$p\_left\_3 = p\_right\_3 = Peak7 - 3*Diff_{AVE}$$

With peak values at the minor peaks now set at levels reflecting a "perfect triangle" below the main peak (Peak7), step 980 calculates the sum of the differences between the measured and the "perfect" data. At step 982, the sum of the squares of the differences is computed. Step 984 computes the standard deviation of the data. Step 990 then computes a metric $Diff_{AVE}/Std$, which is compared with a threshold, metric_threshold. If the computed $Diff_{AVE}/Std$ is less than a metric_threshold, then the bit transition detected may not be accurate. This result may be used to have the bit transition process continue. The metric_threshold may be precomputed to give a predicted probability of false alarms for the bit sync process.

One of ordinary skill in the art will appreciate that the methods and systems described herein may be implemented using one or more processors having memory resources available for storing program code and data. One skilled in the art will also appreciate that all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed.

The foregoing description of implementations has been presented for purposes of illustration and description. It is not exhaustive and does not limit the claimed inventions to the precise form disclosed. In particular, examples of the present invention have been described in the context of communication by GNSS satellites and receivers. One of ordinary skill in the art will appreciate that nothing limits the practice of examples of the present invention to the examples described or to GNSS systems. Bit synchronization issues arise in many forms of digital communication, many of which will find use of examples of this invention advantageous. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed:

1. A method for synchronizing a receiver of a bit stream to the bit stream comprising:
   selecting a finite sample of N received bits, the bits having a bit period of T units of time;
   generating a time sequence stream of values representing the N received bits sampled with a sample period of S units of time, where S is an integer sub-multiple of T;
   generating a correlated sequence of values by correlating the time sequence stream of values with a known time sequence stream of values;
   selecting a first sample period in the correlated sequence and defining a cycle of X offsets from the first sample period, where X=T/S−1, each offset representing a sample period that is a number of sample periods away from the first sample period, each offset corresponding to one of the values from the correlated sequence of values;
   initializing Y accumulators, where Y is less than or equal to T/S, a first accumulator corresponding to a zero offset representing the first sample period, the remaining accumulators each corresponding to one of the X offsets;
   starting with a first value at the offset corresponding to each accumulator, summing in each accumulator corresponding to the offset, each value at each sample period at each offset until values at X subsequent offsets have been summed to the first value;
   calculating a magnitude for each sum of values in each of the Y accumulators;
   adding the magnitude to a sum of magnitudes in each of Y non-coherent summers corresponding to each offset;
   repeating the steps of summing in each accumulator, calculating the magnitude, and adding the magnitudes until samples for all N bits have been summed; and
   defining a main peak location as the offset corresponding to the non-coherent summer having the highest sum of magnitudes.

2. The method of claim 1 further comprising:
   calculating a probability of transition; and
   applying a bit synchronization analysis method to determine if the bit transition location passes or fails.

3. The method of claim 2 where the bit synchronization analysis method comprises:
   generating an array of peak values from at least a set of the Y sums of magnitudes where a plot of the peak values against the offsets corresponding to each peak shows the largest magnitude forming a main peak between peaks on either side of the main peak and substantially linear patterns formed by the peaks right and left of the main peak;
   generating a right line by a first order curve fit using at least one peak to the right of the main peak and the main peak, the right line having a right slope and a right intercept;
   generating a left line by a first order curve fit using at least one peak to the left of the main peak and the main peak, the left line having a left slope and a left intercept;
   identifying a predicted peak by identifying an intersection point on a timeline formed by the offsets at which the right line intersects the left line; and
   providing indication that the main peak location passes if the intersection point is within a predefined interval around the main peak location.

4. The method of claim 3 where the array of peak values is generated as an ordered set of peak values, the first element in the array containing the main peak, the second element in the array containing the second highest peak value, the third element in the array containing the third highest peak value, and so on for all of the elements in the array, the method further comprising:
   testing the sums of magnitudes by:
      determining if the second and third highest peak values are valid peaks by checking if the second and third highest peak values correspond to the sums of magnitudes one offset to the right and left of the offset corresponding to the main peak;
      determining if the fourth and fifth highest peak values are valid peaks by checking if the fourth and fifth highest peak values correspond to the sums of magnitudes two offsets to the right and left of the offset corresponding to the main peak;

determining if the sixth and seventh highest peak values are valid peaks by checking if the sixth and seventh highest peak values correspond to the sums of magnitudes three offsets to the right and left of the offset corresponding to the main peak;

if only the second and third peaks are valid peaks, selecting a two-point bit synchronization analyzer method that uses one peak to the right of the main peak and the main peak to define a right slope of the right line and one peak to the left of the main peak and the main peak to define a left slope of a left line;

if only the second, third, fourth and fifth peaks are valid peaks, selecting a four-point bit synchronization analyzer method that uses two peaks to the right of the main peak to generate the right line and two peaks to the left of the main peak to generate the left line; and if the second, third, fourth, fifth, sixth and seventh peaks are valid peaks, selecting a six-point bit synchronization analyzer method that uses three peaks to the right of the main peak to generate the right line and three peaks to the left of the main peak to generate the left line.

5. The method of claim 4 wherein, if the two point bit synchronization analyzer method is used, performing the steps of:
calculating a slope of the right line;
calculating a slope of the left line;
calculating the probability of transition using:
probability of transition=5*(slope of left line+slope of light line)/main peak; and
comparing the probability of transition with a minimum probability.

6. The method of claim 3 wherein before performing the bit synchronization analysis, performing the steps of:
calculating a probability of bit transition; and
performing the bit synchronization analysis if the probability of bit transition is greater than a minimum probability.

7. The method of claim 3 wherein before performing the bit synchronization analysis, performing the steps of:
calculating a number of bit transitions using:
No. bit transitions=p_trans*T(elapsed)secs.*50 bps;
measuring a carrier to noise level ($C/N_o$) and calculating a minimum number of transitions based on the $C/N_0$.

8. The method of claim 2 where the bit synchronization analysis method comprises:
generating an array of peak values from at least a set of the Y sums of magnitudes where a plot of the peak values against the offsets corresponding to each peak shows the largest magnitude forming a main peak between peaks on either side of the main peals and substantially linear patterns formed by the peaks right and left of the main peak;
generating a second array of peak values by:
calculating an average difference, $DIFF_{AVE}$, between the main peak and each peak value in the array of peak values;
generating a set of ideal right peaks using:
peak_right_n=main peak−n*$DIFF_{AVE}$, where n=an integer number of offsets from the main peak offset;
generating a set of ideal left peaks using:
peak_left_n=main peak−n*$DIFF_{AVE}$, where n=an integer number of offsets from the main peak offset greater than 1;
calculating a sum of the differences, $DIFF_{SUM}$, using:
Diff_Sum=(right_1−peak_right_1)+(right_2−peak_right_2)+ . . . +(right_n−peak_right_n)+(left_1−peak_left_1)+(left_2−peak_left_2)+ . . . +(left_n−peak_n), where right_n is the peak value n offsets to the right of the main peak and left_n is the peak value n offsets to the left of the main peak;
calculating a sum of squares, SUM_SQ, using:

$$SUM\_SQ = (right\_1 - p\_right\_1)^2 + (right\_2 - p\_right\_2)^2 + \ldots + (right\_n - p\_right\_n)^2 + (left\_1 - p\_left\_1)^2 + (left\_2 - p\_left\_2)^2 + \ldots + (left\_n - p\_left\_n)^2$$

calculating a standard deviation, STD; and
indicating that the main peak location passes if $DIFF_{AVE}$/STD is not less than a predetermined metric threshold.

9. A Global Navigation Satellite System (GNSS) Receiver comprising hardware and software components programmed to perform the method of claim 1.

10. A Global Navigation Satellite System (GNSS) Receiver comprising hardware and software components programmed to perform the method of claim 2.

11. A Global Navigation Satellite System (GNSS) Receiver comprising hardware and software components programmed to perform the method of claim 3.

12. A Global Navigation Satellite System (GNSS) Receiver comprising hardware and software components programmed to perform the method of claim 1 where the bit period T=20 ms, the sample period S=1 ms, X=20, and Y=20.

13. A system for synchronizing a receiver of a bit stream to the bit stream comprising:
a correlator to generate a correlated sequence of values by correlating a time sequence stream of values from a finite sample of received bits with a known sequence stream of values,
a plurality of offset accumulators, each corresponding to an offset in a series of time intervals within the correlated sequence, starting with a first time period, the accumulators operable to add a number of values equal to a number of samples in a bit period, the number of values added by each accumulator being a set of values in the correlated sequence starting with the value at the offset corresponding to the accumulator;
a plurality of magnitude calculators, each corresponding to one of the offsets, operable to receive a sum from the corresponding accumulator, and to calculate a magnitude; and
a plurality of non-coherent summers each corresponding with one of the offsets, the non-coherent summers operable to add the magnitudes received for each offset in each bit period for all of the N bits, the total sum of magnitudes in each non-coherent summer being analyzed for the highest sum of magnitudes, such that the offset corresponding to the non-coherent summer with the highest sum of magnitudes represents the location of the bit transition in the bit period.

14. The system of claim 13 further comprising a bit synchronization analyzer to analyze the sums of magnitudes in the non-coherent summers to determine whether the location of the bit transition was correctly determined.

15. The system of claim 14 where the bit synchronization analyzer includes hardware and/or software components programmed to perform steps of:
generating an array of peak values from at least a set of the Y sums of magnitudes where a plot of the peak values against the offsets corresponding to each peak shows the largest magnitude forming a main peak between peaks on either side of the main peak and substantially linear patterns formed by the peaks right and left of the main peak;

generating a right line by a first order curve fit using at least two peaks to the right of the main peak, the right line having a right slope and a right intercept;

generating a left line by a first order curve fit using at least two peaks to the left of the main peak, the left line having a left slope and a left intercept;

identifying a predicted peak by identifying an intersection point on a timeline formed by the offsets at which the right line intersects the left line, and indicating that the main peak location passes if the intersection point is within a peak offset time limit of the main peak location.

16. The system of claim 14 where the bit synchronization analyzer includes hardware and/or software components programmed to perform steps of:

generating an array of peak values from at least a set of the Y sums of magnitudes where a plot of the peak values against the offsets corresponding to each peak shows the largest magnitude forming a main peak between peaks on either side of the main peak and substantially linear patterns formed by the peaks right and left of the main peak;

generating a second array of peak values by:

calculating an average difference, $DIFF_{AVE}$, between the main peak and each peak value in the array of peak values;

generating a set of ideal right peaks using:

peak_right.sub_n=main peak−n*$DIFF_{AVE}$, where n=an integer number of offsets from the main peak offset;

generating a set of ideal left peaks using:

peak_left_n=main peak−n*$DIFF_{AVE}$, where n=an integer number of offsets from the main peak offset greater than 1;

calculating a sum of the differences, $DIFF_{SUM}$, using:

Diff_Sum=(right_1−peak_right_1)+(right_2−peak_right_2)+ . . . +(right_n−peak_right_n)+(left_1−peak_left_1)+(left_2−peak_left_2)+ . . . +(left_n−peak_left_n), where right_n is the peak value n offsets to the right of the main peak and left_n is the peak value n offsets to the left of the main peak;

calculating a sum of squares, SUM_SQ, using:

$$SUM\_SQ = (right\_1 - p\_right\_1)^2 + (right\_2 - p\_right\_2)^2 + \ldots + (right\_n - p\_right\_n)^2 + (left\_1 - p\_left\_1)^2 + (left\_2 - p\_left\_2)^2 + \ldots + (left\_n - p\_left\_n)^2$$

calculating a standard deviation, STD; and indicating that the main peak location passes if $DIFF.sub.AVE/STD$ is not less than a predetermined metric threshold.

17. A method for synchronizing a receiver of a bit stream to the bit stream comprising:

selecting a finite sample of N received bits, the bits having a bit period of T units of time;

generating a correlated sequence of values by correlating a time sequence stream of values representing the N received bits, with a known time sequence stream of values, wherein the time sequence stream of values is sampled with a sample period of S units of time, where S is an integer sub-multiple of T;

selecting a first sample period in the correlated sequence and defining a cycle of X offsets from the first sample period, where X=T/S−1, each offset representing a sample period that is a number of sample periods away from the first sample period, each offset corresponding to one of the values from the correlated sequence;

initializing Y accumulators, where Y less than or equal to T/S, a first accumulator corresponding to a zero offset representing the first sample period, the remaining accumulators each corresponding to one of the X offsets;

starting with a first value at the offset corresponding to each accumulator, summing in each accumulator corresponding to the offset, each value at each sample period at each offset until values at X subsequent offsets have been summed to the first value;

calculating a power magnitude for each sum of values in each of the Y accumulators;

adding the power magnitude to a sum of power magnitudes in each of Y non-coherent summers corresponding to each offset;

repeating the steps of summing in each accumulator, calculating the power magnitude, and adding the power magnitudes until samples for all N bits have been summed; and defining a main peak location as the offset corresponding to the non-coherent summer having the highest sum of power magnitudes.

18. The method of claim 17 further comprising:

calculating a probability of transition; and applying a bit synchronization analysis method to determine if the main peak location passes or fails.

19. The method of claim 18 where the bit synchronization analysis method comprises:

generating an array of peak values from at least a set of the Y sums of magnitudes where a plot of the peak values against the offsets corresponding to each peak shows the largest magnitude forming a main peak between peaks on either side of the main peak and substantially curvilinear patterns formed by the peaks right and left of the main peak;

generating a right curve by curve-fitting using at least two peaks to the right of the main peak, the right curve having a light second order curve fit;

generating a left curve by curve-fitting using at least two peaks to the left of the main peak, the left curve having a left second order curve fit;

identifying a predicted peak by identifying an intersection point on a timeline formed by the offsets at which the right curve intersects the left curve; and indicating that the main peak location passes if the intersection point is within a peak offset time limit of the main peak location.

20. The method of claim 19 wherein before performing the bit synchronization analysis, performing the steps of:

calculating a probability of bit transition; and performing the bit synchronization analysis if the probability of bit transition is greater than a minimum probability.

21. The method of claim 19 wherein before performing the bit synchronization analysis, performing the steps of:

calculating a number of bit transitions using:

No. bit transitions=p_trans*T(elapsed)secs.*50 bps;

measuring a carrier to noise level ($C/N_0$) and calculating a minimum number of transitions based on the $C/N_0$.

22. A Global Navigation Satellite System (GNSS) Receiver comprising hardware and software components programmed to perform the method of claim 17.

23. A Global Navigation Satellite System (GNSS) Receiver comprising hardware and software components programmed to perform the method of claim 18.

24. A Global Navigation Satellite System (GNSS) Receiver comprising hardware and software components programmed to perform the method of claim 19.

25. A Global Navigation Satellite System (GNSS) Receiver comprising hardware and software components programmed to perform the method of claim 17 where the bit period T=20 ms, the sample period S=1 ms, X=20, and Y=20.

26. A system for synchronizing a receiver of a bit stream to the bit stream comprising:
- a correlator to generate a correlated sequence of values by correlating a of time sequence stream of values from a finite sample of received bits with a known sequence stream of values;
- a plurality of offset accumulators, each corresponding to an offset in a series of time intervals within the correlated sequence, starting with a first time period, the accumulators operable to add a number of values equal to a number of samples in a bit period, the number of values added by each accumulator being a set of values in the correlated sequence starting with the value at the offset corresponding to the accumulator;
- a plurality of power magnitude calculators, each corresponding to one of the offsets, operable to receive a sum from the corresponding accumulator, and to calculate a power magnitude; and
- a plurality of non-coherent summers each corresponding with one of the offsets, the non-coherent summers operable to add the magnitudes received for each offset in each bit period for all of the N bits, the total sum of magnitudes in each non-coherent summer being analyzed for the highest sum of magnitudes, such that the offset corresponding to the non-coherent summer with the highest sum of magnitudes represents the location of the bit transition in the bit period.

27. The system of claim 26 further comprising a bit synchronization analyzer to analyze the sums of magnitudes in the non-coherent summers to determine whether the location of the bit transition was correctly determined.

28. The system of claim 27 where the bit synchronization analyzer includes hardware and/or software components programmed to perform steps of:
- generating a list of peak values from at least a set of the Y sums of magnitudes where a plot of the peak values against the offsets corresponding to each peak shows the largest magnitude forming a main peak between peaks on either side of the main peak and substantially linear patterns formed by the peaks right and left of the main peak;
- generating a right curve by curve-fitting at least two peaks to the right of the main peak;
- generating a left curve by curve-fitting at least two peaks to the left of the main peak;
- identifying a predicted peak by identifying an intersection point on a timeline formed by the offsets at which the right line intersects the left line; and
- indicating that the bit transition location passes if the intersection point is within a peak offset time limit of the bit transition location.

\* \* \* \* \*

UNITED STATES PATENT AND TRADEMARK OFFICE
CERTIFICATE OF CORRECTION

PATENT NO.       : 8,121,238 B2
APPLICATION NO.  : 11/553983
DATED            : February 21, 2012
INVENTOR(S)      : Sundar Raman and James M. Brown It is certified that error appears in the above-identified patent and that said Letters Patent is hereby corrected as shown below:

Column 15, claim 8, line 50 "peals" should be --peaks--.

Column 16, claim 15, line 65 "Y sums of magnitudes" should be --sums of magnitudes--.

Column 17, claim 16, line 21 "Y sums of magnitudes" should be --sums of magnitudes--.

Column 17, claim 16, line 58 "DIFF.sub.AVE" should be --$DIFF_{AVE}$--.

Column 20, claim 28, line 15 "Y sums of magnitudes" should be --sums of magnitudes--.

Signed and Sealed this
Twenty-sixth Day of June, 2012

David J. Kappos
*Director of the United States Patent and Trademark Office*